US011243980B2

(12) United States Patent
Barber et al.

(10) Patent No.: US 11,243,980 B2
(45) Date of Patent: **\*Feb. 8, 2022**

(54) MONOTONIC TRANSACTIONS IN A MULTI-MASTER DATABASE WITH LOOSELY COUPLED NODES

(71) Applicant: International Business Machines Corporation, Armonk, NY (US)

(72) Inventors: Ronald J. Barber, San Jose, CA (US); Ronen Grosman, Thornhill (CA); Mir Hamid Pirahesh, San Jose, CA (US); Vijayshankar Raman, Cupertino, CA (US); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/747,313

(22) Filed: Jan. 20, 2020

(65) Prior Publication Data

US 2020/0151196 A1 May 14, 2020

Related U.S. Application Data

(63) Continuation of application No. 15/459,507, filed on Mar. 15, 2017, now Pat. No. 10,606,863.

(51) Int. Cl.
*G06F 16/27* (2019.01)
*G06F 16/28* (2019.01)

(52) U.S. Cl.
CPC ......... *G06F 16/273* (2019.01); *G06F 16/283* (2019.01)

(58) Field of Classification Search
None
See application file for complete search history.

(56) References Cited

U.S. PATENT DOCUMENTS 7,206,805 B1   4/2007   McLaughlin, Jr.
7,290,056 B1  10/2007   McLaughlin, Jr.
(Continued)

FOREIGN PATENT DOCUMENTS

JP   2010509871 A    3/2010
JP      6030713 B1  11/2016
WO   2015153656 A1  10/2015

OTHER PUBLICATIONS

Gilbert, S. et al., "RAMBO: A Robust, Reconfigurable Atomic Memory Service for Dynamic Networks", Distributed Computing, 2010, pp. 1-52, vol. 23, No. 4, United States.
(Continued)

*Primary Examiner* — Uyen T Le
(74) *Attorney, Agent, or Firm* — Sherman IP LLP; Kenneth L. Sherman; Steven Laut (57) ABSTRACT

One embodiment provides for monotonic transactions in a multi-master database with loosely coupled nodes including performing, by a processor, a read transaction protocol including: performing, by the processor, a read transaction protocol including issuing read transactions at any one of the nodes; attempting to return rows that are known to be replicated by at least a read quorum of the nodes; and for timing-out of the attempting to return rows known to be replicated by at least the read quorum of the nodes based on the special-node being non-responsive: selecting a new special-node from the nodes; and repeating attempting to return rows that are known to be replicated by at least the read quorum of the nodes.

20 Claims, 6 Drawing Sheets

(56) References Cited

U.S. PATENT DOCUMENTS

| | | | |
|---|---|---|---|
| 7,627,694 | B2 | 12/2009 | Sreenivasan |
| 8,990,434 | B2 | 3/2015 | Hasha et al. |
| 9,047,331 | B2 | 6/2015 | Rao |
| 9,760,529 | B1 | 9/2017 | Ho |
| 10,037,346 | B1* | 7/2018 | Hsieh .................. G06F 16/20 |
| 2004/0133606 | A1 | 7/2004 | Miloushev |
| 2007/0239758 | A1 | 10/2007 | Devine |
| 2008/0288646 | A1* | 11/2008 | Hasha .................. H04L 67/104 709/228 |
| 2009/0313311 | A1 | 12/2009 | Hoffmann |
| 2013/0110774 | A1 | 5/2013 | Shah |
| 2013/0110781 | A1 | 5/2013 | Golab |
| 2015/0277969 | A1 | 10/2015 | Strauss |
| 2018/0096068 | A1 | 4/2018 | Venkataramanappa |

OTHER PUBLICATIONS

Gramoli, V., "Distributed Shared Memory for Large-Scale Dynamic Systems", Doctoral Dissertation, Université Rennes 1, 2007, pp. i-164, INRIA Research Centre Rennes.

International Search Report and Written Opinion dated Apr. 16, 2018 for International Application PCT/IB2017/058253 from State Intellectual Property Office of the P.R. China, pp. 1-11, Beijing, China.

Siemens, et al., "A Resynchronization Method based on Request Logs for Data Replication in a Multi-Tier Network Database Environment", Oct. 24, 2007, pp. 1-6, Nokia Siemens Networks, United States.

Weil, Reliable, Scalable, and High-Performance Distributed Storage: Distributed Object Storage, IP.com, No. 100234957, Feb. 19, 2014, pp. 1-11.

Mell, P, et al, "The NIST Definition of Cloud Computing", National Institute of Standards and Technology Special Publication 800-145, Sep. 2011, pp. 1-7, U.S, Department of Commerce, United States.

List of IBM Patents or Applications Treated as Related: Barber, RJ et al., U.S. Appl. No. 15/459,507, filed Mar. 15, 2017.

United Kingdom Examination Report dated Sep. 7, 2021 for UK Patent Application No. GB1914434.4 from Intellectual Patent Office (IPO), pp. 1-3, South Wales, United Kingdom.

Japanese Final Office Action dated Aug. 5, 2021 for JP Patent Application No. 2019-548929 from Japanese Patent Office, pp. 1-8, Tokyo, Japan (English-language translation included on pp. 1-4).

Response to United Kingdom Examination Report filed Oct. 27, 2021 for UK Patent Application No. GB1914434.4 submitted to the UK Intellectual Property Office (IPO), pp. 1-4, Sevenoaks, United Kingdom.

* cited by examiner

Performing, By A Processor, A Write Transaction Protocol — 610

---

The Write Transaction Protocol Including:
A Client Device Issuing Write Transactions At Any Of The Nodes;
Recording A Write Transaction Locally At A Node That Issues A Write Transaction And Asynchronously Replicating The Write Transaction To At Least One Other Node; And
Waiting For Reception Of An Acknowledgment From At Least A Quorum Of The Nodes Before Returning A Response To The Client Device, Wherein The Quorum Is Any Set Of The Nodes That Includes A Special Node And At Least One Other Node — 620

FIG. 6

MONOTONIC TRANSACTIONS IN A MULTI-MASTER DATABASE WITH LOOSELY COUPLED NODES

BACKGROUND

Online transaction processing (OLTP) applications are used for databases that provide ACID (high atomicity, consistency, isolation and durability) consistency properties, but are increasingly working in loosely coupled "AP" (availability, partition tolerance) settings where consistency guarantees are not strong. In particular, when a transaction inserts rows and commits, the application expects one of three returns: a) transaction success, b) transaction rolls back (e.g., constraint violation), c) transaction status unknown (usually due to a driver or connection error, and an application can issue queries to check the status). But in any case, after a commit, in conventional ACID database management systems (DBMSs), subsequent reads see the same answers a (i.e., monotonic behavior). If one query sees the inserted rows, then subsequent queries will also see those inserted rows, consistently (for return c), an app has to issue a read to find out status).

In an AP environment (e.g., with many NoSQL (non-structured query language) DBMSs), there is a fourth return, referring to a problematic return state: d) transaction status may not be settled yet. This happens when the node (where a node is a client device, a server, or peer device) running the transaction has sent the changes/inserts (as a log message) to other replicas, but has not heard acknowledgements from them (indicating that they received or accepted the changes). In this state, subsequent queries see unpredictable behavior. A first query may not find those rows—because they have not replicated yet to sufficient number of replicas (according to a quorum policy). But a later query may find those rows.

SUMMARY

Embodiments relate to quorum processing for replication in a multi-master database with loosely coupled nodes. One embodiment provides a method for monotonic transactions in a multi-master database with loosely coupled nodes including performing, by a processor, a read transaction protocol including: performing, by the processor, a read transaction protocol including issuing read transactions at any one of the nodes; attempting to return rows that are known to be replicated by at least a read quorum of the nodes; and for timing-out of the attempting to return rows known to be replicated by at least the read quorum of the nodes based on the special-node being non-responsive: selecting a new special-node from the nodes; and repeating attempting to return rows that are known to be replicated by at least the read quorum of the nodes.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for quorum processing for replication in a multi-master database with loosely coupled nodes. One embodiment provides a method for monotonic transactions in a multi-master database with loosely coupled nodes including performing, by a processor, a write transaction protocol including: a client device issuing write transactions at any of the nodes, recording a write transaction locally at a node that issues a write transaction and asynchronously replicating the write transaction to at least one other node, and waiting for reception of an acknowledgment from at least a quorum of the nodes before returning a response to the client device. The quorum is any set of the nodes that includes a special node and at least one other node.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
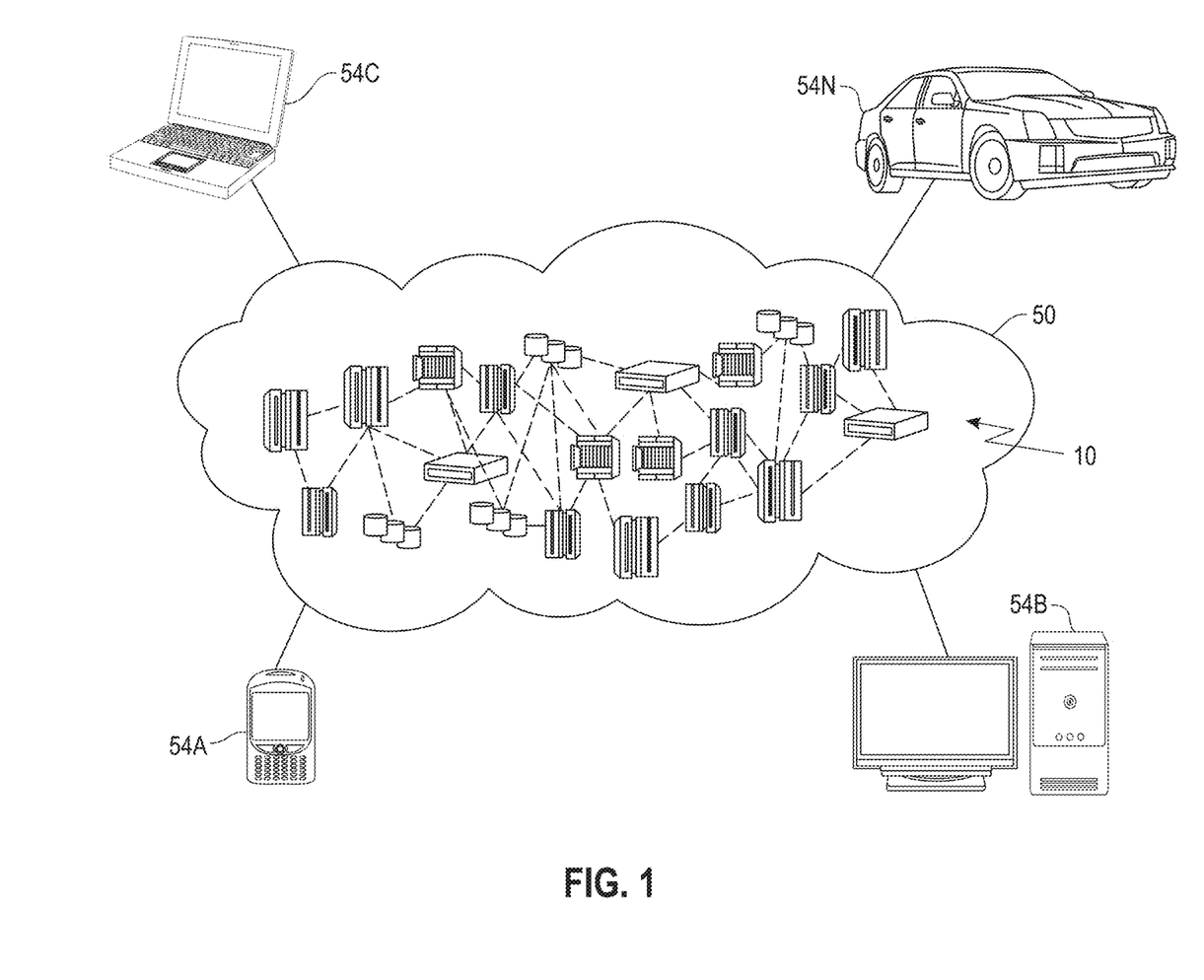
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
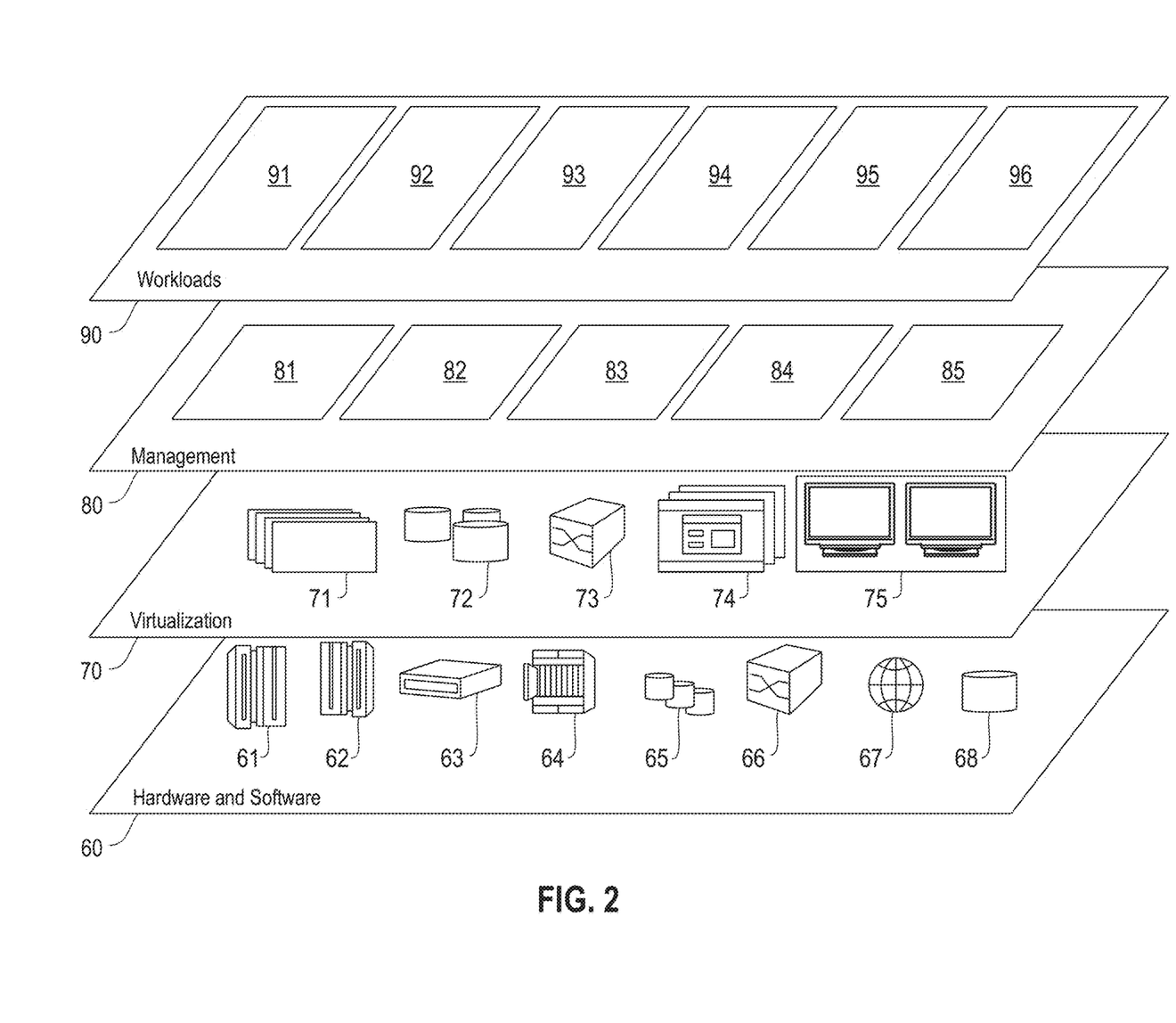
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and quorum processing for replication in a multi-master database with loosely coupled nodes 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
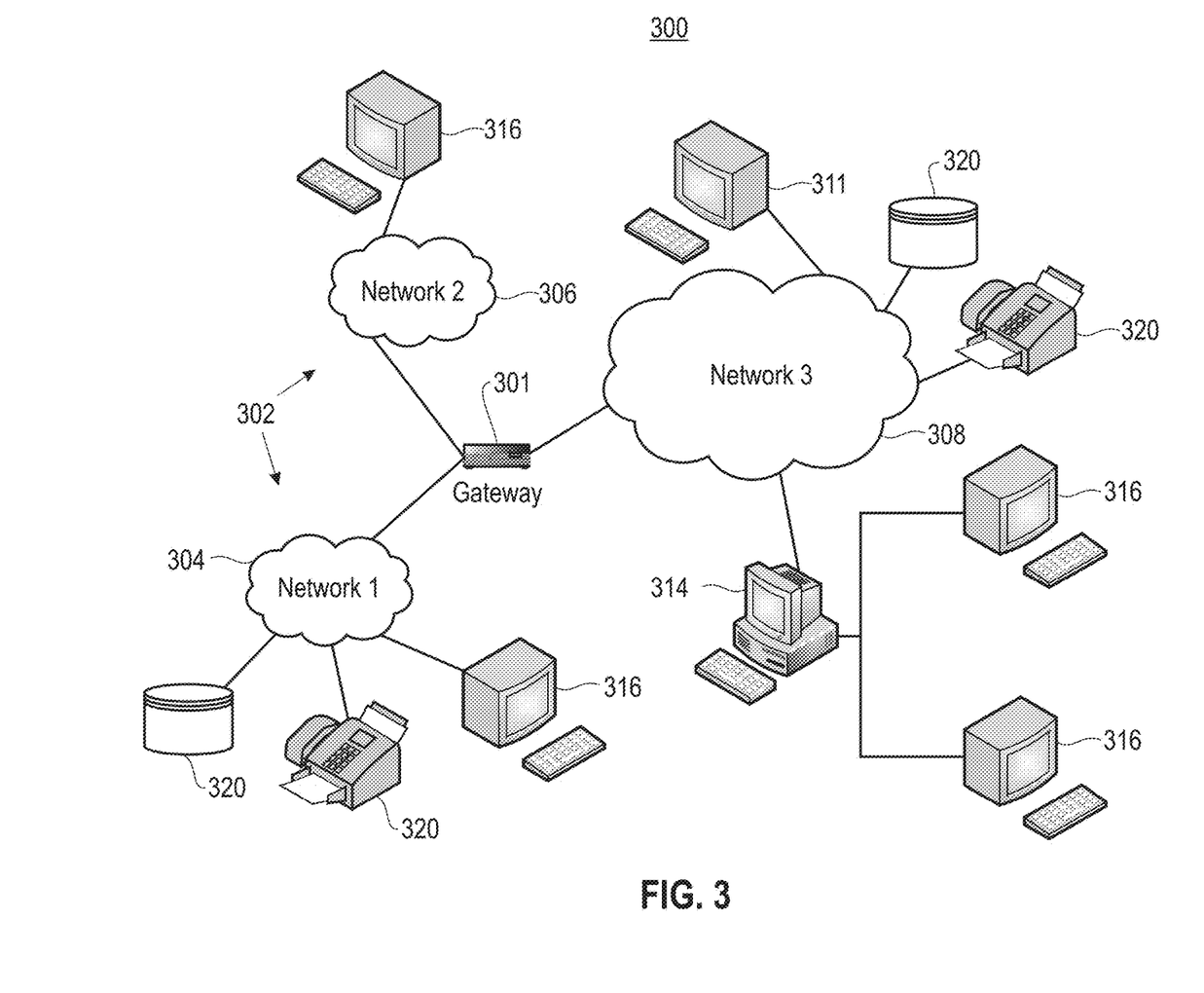
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
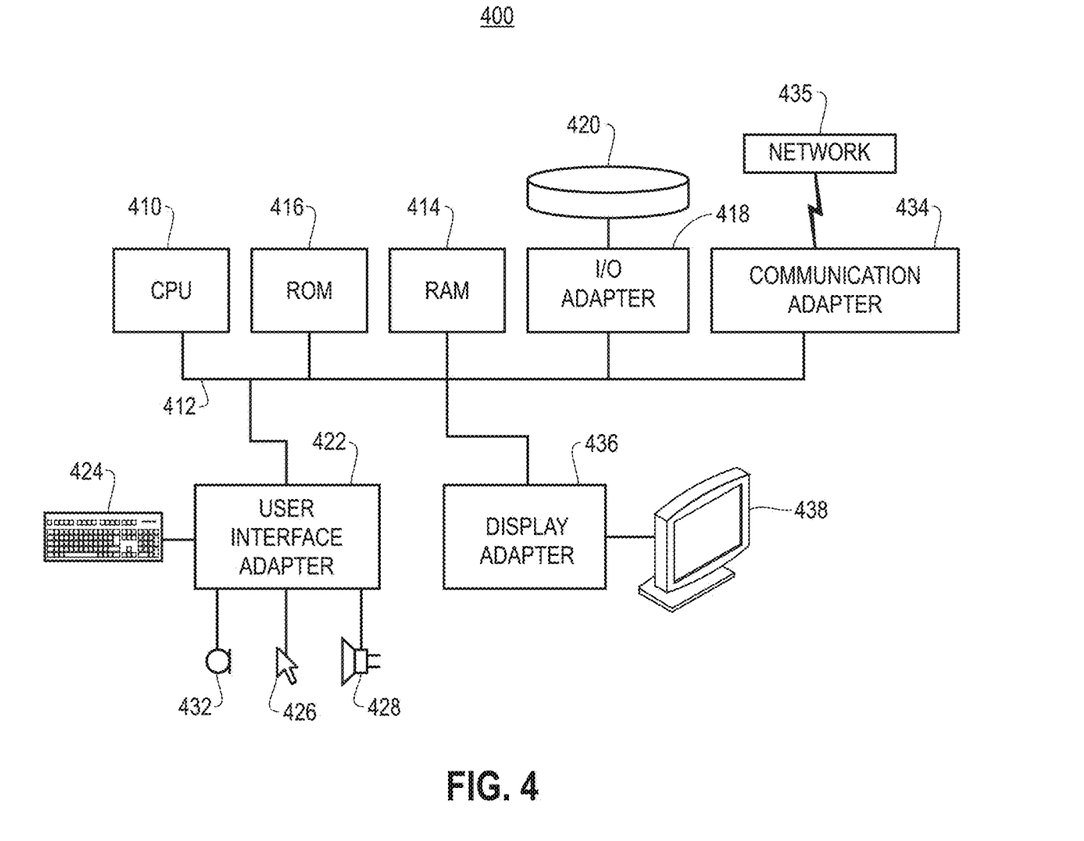
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

In conventional replicated databases, a data object has copies present at multiple locations. A vital consistency guarantee that such databases give to applications is monotonic reads. A write operation (also known conventionally as a transaction) modifies the database state atomically, and all subsequent reads (queries) either see the operation's modification (in which case the operation is said to have succeeded or committed), or not see the operation's modification (in which case the operation is said to have rolled back). In conventional replicated databases, this guarantee is achieved through a quorum-based replica control protocol with synchronous, blocking writes. Specifically, each copy of a replicated data item is assigned a vote. Each operation then has to obtain a read quorum ($T_r$) or a write quorum ($T_w$) to read or write a data item, respectively. If a given data item has a total of T votes, the quorums have to obey the following rules:

$$T_r + T_w > T \qquad 1.$$

$$T_w > T/2 \qquad 2.$$

A write operation has to wait until the modifications from that write have replicated to a write quorum of replicas, and this has to be verified by waiting for acknowledgements. Further, if this waiting process fails or times-out, the write has to be rolled back. This is typically achieved with a two-phase commit protocol. Thus, these rules ensure that two write quorums always have a common node, and that any read quorum contains at least one site with the newest version of the data item. Therefore, either a write succeeds or rolls-back atomically, and all subsequent reads see a consistent image of the database. In such consistent systems, there is also a third return situation possible: write operation status unknown. This can happen for example when the connection between database and application fails, or the application times-out when waiting for a response from the database. But still, even in such situation, the application can query the database for the status of the write operation—and that query (all subsequent queries), will see consistent answers. The disadvantage of this approach is that it requires a tightly connected system where nodes are available and responsive. For example, once a two-phase commit protocol has begun, if the initiator node becomes unresponsive, the system is unavailable to subsequent reads.

Distinguishable from consistent systems having three return situations (i.e., success, failure with rollback and unknown), in eventual consistency systems applications eventually get monotonic reads, but there is some time after the completion of a write when reads may see inconsistent answers. When the database state is modified by a write operation, the return statuses are success and unknown. In the last case, subsequent reads get varying answers. If a read goes to one of the nodes to which the modification has been replicated, the read sees the modification, and a later read (that goes to a different node) might not see the modifications; then another read sees the modifications. But eventual consistency systems have high availability. Writes can happen at any node ("multi-master"); asynchronously replicated to other nodes; and the system can tolerate failures of some number of nodes.

Multi-master replication (or peer-to-peer n-way replication) is a method of database replication which provides for data to be stored by a group of computers, and updated by any member of the group. Updates made to an individual master site are propagated to all other master sites. Multi-master replication provides convergence of the data of all database table replicas, and provides global transaction consistency and data integrity. Conflict resolution is independently handled at each of the master nodes. Multi-master replication provides complete replicas of each replicated database table at each of the master nodes. All members are responsive to client data queries. The multi-master replication system is responsible for propagating the data modifications made by each member to the rest of the group, and resolving any conflicts that might arise between concurrent changes made by different members. Multi-master replication provides increased availability and faster server response time.

In conventional ACID DBMSs, the four states of atomicity, consistency, isolation and durability provides the following. For atomicity, database modification transactions (i.e., atomic transactions) must follow an "all or nothing" rule. If one portion of a transaction fails, the entire transaction fails. For consistency, only valid data will be written to the database. If a transaction is executed that violates the database's consistency rules, the entire transaction will be rolled back, and the database will be restored to a state consistent with those rules. If a transaction successfully executes, it will take the database from one state that is consistent with the rules to another state that is also consistent with the rules. For isolation, multiple transactions occurring at the same time do not impact each other's execution. For two simultaneous issued transactions against a database, both transactions operate on the database in an isolated manner. The database either performs one entire transaction before executing the other, or vice-versa. This prevents one transaction from reading intermediate data produced as a side effect of part of the other transaction that will not eventually be committed to the database. The isolation property does not ensure which transaction will execute first, but that they will not interfere with each other. For durability, any transaction committed to the database will not be lost. Durability uses backups and transaction logs that facilitate the restoration of committed transactions regardless of subsequent failures (e.g., software or hardware failures).

Figure 5:
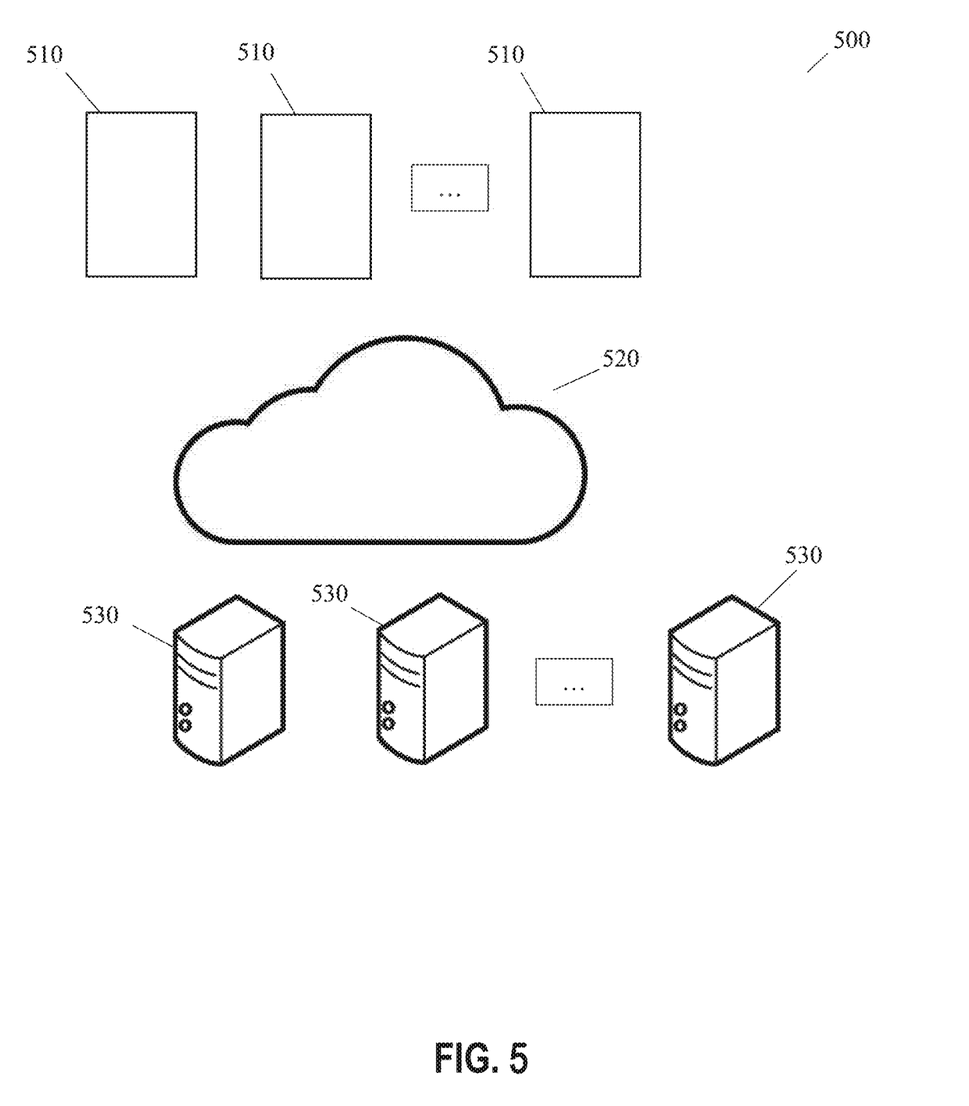
FIG. 5 is a block diagram illustrating system for quorum processing for replication in a multi-master database with loosely coupled nodes, according to one embodiment.

FIG. 5 is a block diagram illustrating a system 500 for quorum processing for replication in a multi-master database with loosely coupled nodes, according to one embodiment. In one embodiment, the system 500 includes client devices 510 (e.g., mobile devices, smart devices, computing systems, etc.), a cloud or resource sharing environment 520, and servers 530. In one embodiment, the client devices are provided with cloud services from the servers 530 through the cloud or resource sharing environment 520. In one embodiment, system 500 is a multi-master database system that provides that one node is elected as a special node (or leader node) using a consensus protocol. Consensus is the process of agreeing on one result among a group of participants. In one embodiment, in system 500, for a write quorum, the special node and at least one non-special (or non-leader) node must be part of any write quorum. For a read quorum, the special node and at least one non-special node must be part of any read quorum. Note that both the write quorum and the read quorum may demand additional nodes to be participants, depending on durability requirements. After a commit transaction, the initiator node waits for that transaction's log to be replicated to a write-quorum of nodes (and receive an acknowledgement (ack)) before returning a SUCCESS result notification. The initiator node never times-out while waiting for acks. An application may time out, in which case the return state is transaction status UNKNOWN.

In one embodiment, in system 500 writes (transactions) can go to any node. In one embodiment, the system 500 adopts a quorum-read quorum-write protocol where reads see only data that is visible on a quorum of nodes and a quorum is one or more sets of nodes. In one example embodiment, Quorum is any set with at least a majority of nodes. The system 500 maintains an elected Special-Node, and uses a write protocol and write quorum where: writes wait until they are notified with an acknowledgement (that the write was replicated) from at least the write quorum of nodes, writes operations never timeout, and any read quorum and any write quorum always contains a special node and at least one other node.

In one or more embodiments, it should be noted that the special node may fail at any time and a new special node may have to be elected. This is why a special-only quorum does not work. When a new special node is elected, it is guaranteed that any successful transactions (a transaction is successful if either the commit returns SUCCESS or it returned the state transaction status UNKNOWN, and a subsequent query saw the modifications of the transaction) have their respective changes propagated to the previous special node plus at least one other node. The other node may be used to recover all successful transactions, even if the previous special node is now unresponsive.

In one embodiment, in system 500, the write protocol includes that the system 500 may: 1) issue a write at any node; 2) records the write locally (at that node) and asynchronously replicated to others; 3) waits until acknowledgements of receipt has been received from at least a quorum of nodes; and 4) where a client device 510 can timeout during 3), and then find out the status of write by issuing reads.

In one embodiment, in system 500, the read protocol includes that the system 500 may: 1) issue a read at any node; 2) a read only returns rows that are known to be replicated at least a quorum of nodes; and 3) if the read at 2) times out because the special node is not responsive, the system 500 elects a new special node via a consensus protocol, and continues to 2).

In one example embodiment, the system 500: 1) issues a write at node A (which is elected as a special node), where system 500 has other nodes B, C, D and E; 2) a client device 510 times out and issues a read at any node, for example node C. In this example, in system 500 a read only returns rows that are visible at A and one other node. If node C has received the write in 1), then the read sees the write. Otherwise, node C waits to receive notification from node A, B, D, and/or node E. If node C gets notified that node A and at least one of nodes B, C, D, and E have received the write, then the read sees the write. If the process times out waiting for node A and none of nodes B, C, D and E have received the write yet, a new special node is elected. The original write is lost. Otherwise, the write is always visible to this read and subsequent reads.

In one embodiment, a weighting scheme may be implemented by system 500 as follows. Assume there are three nodes. The special node may have a weight of 0.9. The other two nodes have a weight of 0.3 each. In one embodiment, a threshold for a quorum is that the sum of weights must be ≥1.2, which is the special node plus one other node. It should be noted that other weighting schemes may also be used accordingly.

One or more embodiments provide the following benefits: transactions are able to commit even in a loosely coupled environment where the network may get partitioned or nodes may fail; transactions can be submitted to any node, not just a leader node; even when the return status of a transaction is unknown, the application still has monotonic reads. The read quorum involves a special node, so it can never be the case that one read misses the inserted rows and a subsequent read finds them.

Figure 6:
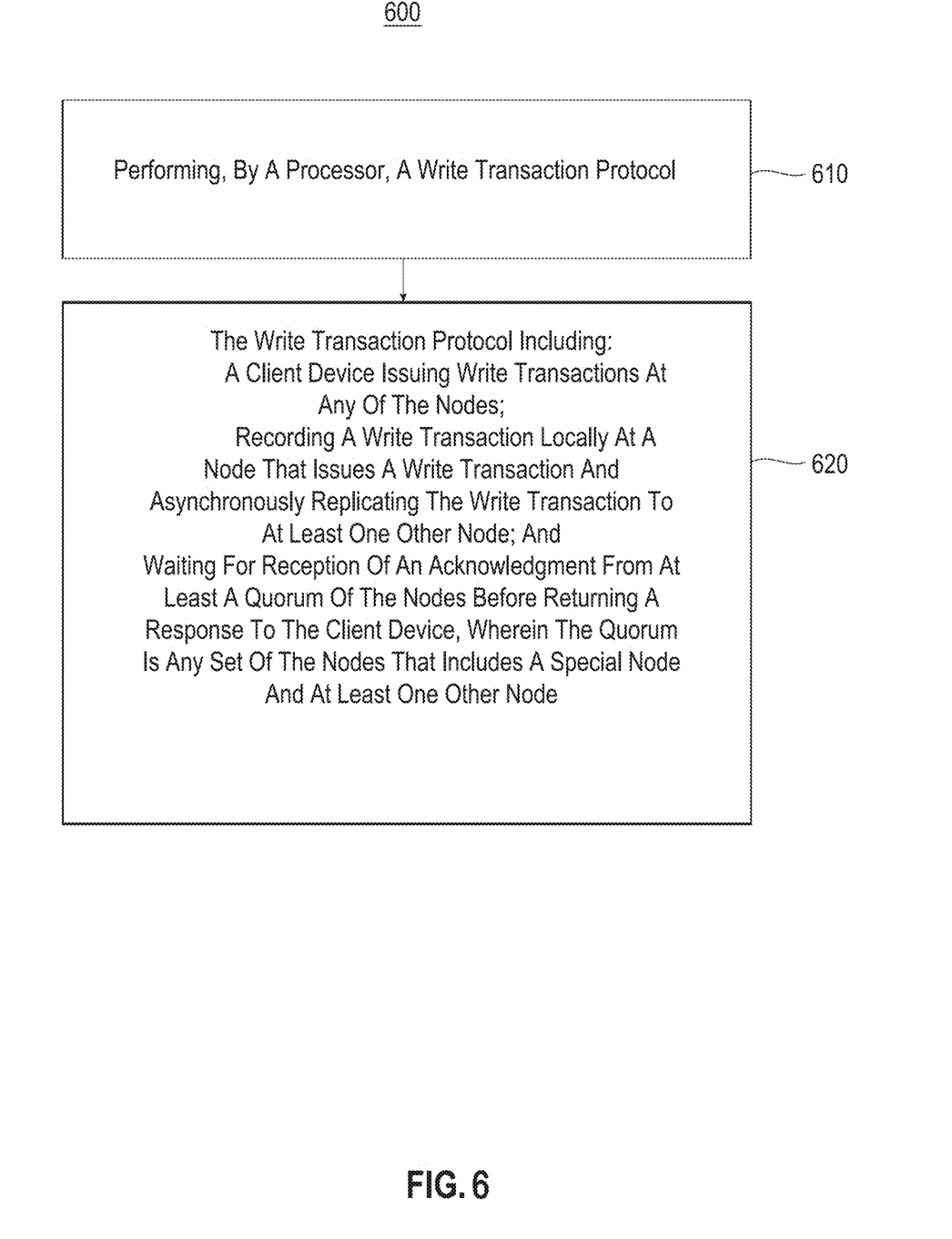
FIG. 6 illustrates a block diagram for a process for monotonic transactions in a multi-master database with loosely coupled nodes, according to one embodiment.

FIG. 6 illustrates a block diagram for a process 600 for monotonic transactions in a multi-master database with loosely coupled nodes, according to one embodiment. In block 610, process 600 performs, by a processor (e.g., a processor in cloud computing environment 50, FIG. 1, system 300, FIG. 3, system 400, FIG. 4, system 500, FIG. 5), a write transaction protocol. In block 620, process 600 continues to perform the write transaction protocol that includes: a client device issuing write transactions at any of the nodes (e.g., a client device 510, a server 530, or any other peer device in the cloud computing environment 50, system 300, system 400, or system 500), recording (the modifications of) a write transaction locally at a node that issues a write transaction and asynchronously replicating the write transaction to at least one other node, and waiting for reception of an acknowledgment from at least a quorum of the nodes before returning a response to the client device. In one embodiment, the quorum is any set of the nodes that includes a special node and at least one other node (and optionally other nodes).

Process 600 may further include performing, by the processor, a read transaction protocol that includes: issuing read transactions at any of the nodes, attempting to return rows that are known to be replicated by at least a quorum of the nodes, and for timing out of the attempting to return rows known to be replicated by at least the quorum of nodes based on the special-node being non-responsive: selecting a new special-node, and repeating attempting to return rows that are known to be replicated by at least the quorum of the nodes.

In one embodiment, process 600 may further upon determining a client device timed out during waiting for receiving an acknowledgment from the multi-master database, the client device obtains status of the write transaction by issuing at least one read transaction. Then the client device waits for a response to this read transaction; and upon this wait exceeding a timeout threshold, the client device repeats to retry the read transaction. In one embodiment, in process 600 selection of a special node includes an election.

In one embodiment, process 600 includes that the special node is any of the nodes, and the election is performed by the processor using a consensus protocol. In one embodiment, in process 600 upon determining timeout of the at least one read transaction, the client device repeats the at least one read transaction.

In one embodiment, for process 600 selecting of the new special-node is performed by the processor upon a transaction failure or non-responsiveness of the special node.

In one embodiment, process 600 may include that the quorum further includes a number of other nodes selected based on a durability requirement. Process 600 may further include assigning weights to the nodes including the special node. For process 600, a weight assigned to the special-node exceeds weights assigned to remaining nodes, and quorum voting may be based on a sum of voting nodes weights being equal to or greater than a quorum threshold.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monotonic transactions in a multi-master database with a plurality of nodes that are loosely coupled, the method comprising:
    electing, by a processor, a special node from the plurality of nodes based on a consensus protocol; and
        performing, by the processor, a read transaction protocol including:
            issuing read transactions at any one of the plurality of nodes;
            attempting to return rows that are known to be replicated by at least a read quorum of the plurality of nodes; and
            for timing-out of the attempting to return rows known to be replicated by at least the read quorum of the plurality of nodes based on the special-node being non-responsive:
                selecting a new special-node from the plurality of nodes; and
                repeating attempting to return rows that are known to be replicated by at least the read quorum of the plurality of nodes.

2. The method of claim 1, further comprising:
performing, by the processor, a read transaction protocol including:
    a client device issuing a write transaction at any one particular node of the plurality of nodes;

recording the write transaction locally at the one particular node of the plurality of nodes and asynchronously replicating the write transaction to at least one other node of the plurality of nodes; and waiting for reception of an acknowledgment from at least a write quorum of the plurality of nodes before returning a response to the client device, wherein the write quorum is any set of the plurality of nodes that includes the special node and at least one other node, and after a commit transaction for storing data from the write transaction to the multi-master database, an initiator node of the plurality of nodes waits to receive an acknowledgement for the commit transaction without ever timing out, and waits for replication of a transaction log to the set of nodes of the write quorum before returning a success result notification for the commit transaction for providing data consistency and visibility of the write transaction for the plurality of nodes.

3. The method of claim 2, wherein upon determining the client device timed out during waiting for receiving an acknowledgment from the multi-master database, the client device obtains status of the write transaction by issuing at least one read transaction.

4. The method of claim 3, further comprising:
upon determining timeout by the client device of the at least one read transaction, repeating, by the client device, the at least one read transaction.

5. The method of claim 2, wherein the selecting of the new special-node is performed by the processor upon a transaction failure or non-responsiveness of the special node.

6. The method of claim 2, further comprising:
assigning weights to the plurality of nodes including the special node, wherein a weight assigned to the special-node exceeds weights assigned to remaining nodes of the plurality of nodes, write quorum voting is based on a first sum of voting nodes weights being equal to or greater than a write quorum threshold, and read quorum voting is based on a second sum of voting nodes weights being equal to or greater than a read quorum threshold.

7. The method of claim 1, wherein the write quorum and the read quorum each further includes a number of other nodes of the plurality of that are selected based on a durability requirement.

8. A computer program product for monotonic transactions in a multi-master database with a plurality of nodes that are loosely coupled, the computer program product comprising a computer readable storage medium having program instructions embodied therewith, the program instructions executable by a processor to cause the processor to:
elect, by the processor, a special node from the plurality of nodes based on a consensus protocol; and
perform, by the processor, a read transaction protocol including:
issue read transactions at any one of the plurality of nodes;
attempt to return rows that are known to be replicated by at least a read quorum of the plurality of nodes; and
for timing out of the attempting to return rows known to be replicated by at least the read quorum of the plurality of nodes based on the special-node being non-responsive:
select a new special-node from the plurality of nodes; and
repeat attempting to return rows that are known to be replicated by at least the read quorum of the plurality of nodes.

9. The computer program product of claim 8, further comprising program instructions executable by the processor to cause the processor to:
perform, by the processor, a write transaction protocol including:
a client device issuing a write transaction at any one particular node of the plurality of nodes;
recording the write transaction locally at the one particular node of the plurality of nodes and asynchronously replicating the write transaction to at least one other node of the plurality of nodes; and
waiting for reception of an acknowledgment from at least a write quorum of the plurality of nodes before returning a response to the client device, wherein the write quorum is any set of the plurality of nodes that includes the special node and at least one other node, and after a commit transaction for storing data from the write transaction to the multi-master database, an initiator node of the plurality of nodes waits to receive an acknowledgement for the commit transaction without ever timing out, and waits for replication of a transaction log to the set of nodes of the write quorum before returning a success result notification for the commit transaction for providing data consistency and visibility of the write transaction for the plurality of nodes.

10. The computer program product of claim 9, further comprising program instructions executable by the processor to cause the processor to:
assign, by the processor, weights to the plurality of nodes including the special node,
wherein a weight assigned to the special-node exceeds weights assigned to remaining nodes of the plurality of nodes, and write quorum voting is based on a first sum of voting nodes weights being equal to or greater than a write quorum threshold, and read quorum voting is based on a second sum of voting nodes weights being equal to or greater than a read quorum threshold.

11. The computer program product of claim 9, wherein the selecting of the new special-node is performed by the processor upon a transaction failure or non-responsiveness of the special node.

12. The computer program product of claim 9, further comprising:
upon determining timeout of the at least one read transaction, repeating, by the client device, the at least one read transaction.

13. The computer program product of claim 9, wherein selecting of the new special-node is performed by the processor upon a transaction failure or non-responsiveness of the special node.

14. The computer program product of claim 8, wherein the write quorum and the read quorum each further includes a number of other nodes of the plurality of nodes that are selected based on a durability requirement.

15. The computer program product of claim 8, wherein upon determining the client device timed out during waiting for receiving an acknowledgment from the multi-master database, the client device obtains status of the write transaction by issuing at least one read transaction.

16. An apparatus comprising:
a memory configured to store instructions; and
a processor configured to execute the instructions to:

elect a special node from a plurality of nodes that are loosely coupled in a multi-master database based on a consensus protocol; and perform a read transaction protocol including:
  issue read transactions at any one of the nodes of the plurality of nodes;
  attempt to return rows that are known to be replicated by at least a read quorum of the plurality of nodes; and
  for timing out of the attempting to return rows known to be replicated by at least the read quorum of the plurality of nodes based on the special-node being non-responsive:
    select a new special-node; and
  repeat attempting to return rows that are known to be replicated by at least the read quorum of the plurality of nodes.

17. The apparatus of claim 16, wherein the processor is further configured to:
perform a write transaction protocol including:
  a client device issuing a write transaction at any one particular node of the plurality of nodes;
  recording the write transaction locally at the one particular node of the plurality of nodes and asynchronously replicating the write transaction to at least one other node of the plurality of nodes;
  waiting for reception of an acknowledgment from at least a write quorum of the plurality of nodes before returning a response to the client device, wherein the write quorum is any set of the plurality of nodes that includes the special node and at least one other node; and
  after a commit transaction for storing data from the write transaction to the multi-master database, waiting by an initiator node of the plurality of nodes to receive an acknowledgement for the commit transaction, without ever timing out, and waiting for replication of a transaction log to the set of nodes of the write quorum before returning a success result notification for the commit transaction for providing data consistency and visibility of the write transaction for the plurality of nodes.

18. The apparatus of claim 17, wherein:
selection of the new special-node is performed by the processor upon a transaction failure or non-responsiveness of the special node;
the write quorum and the read quorum each further includes a number of other nodes of the plurality of nodes that are selected based on a durability requirement; assign weights to the plurality of nodes including the special node;
a weight assigned to the special-node exceeds weights assigned to remaining nodes of the plurality of nodes; and
write quorum voting is based on a first sum of voting nodes weights being equal to or greater than a write quorum threshold, and read quorum voting is based on a second sum of voting nodes weights being equal to or greater than a read quorum threshold.

19. The apparatus of claim 16, wherein:
upon determining the client device timed out during waiting for receiving an acknowledgment from the multi-master database, the client device obtains status of the write transaction by issuing at least one read transaction.

20. The apparatus of claim 19, wherein:
upon determining timeout of the at least one read transaction, repeating, by the client device, the at least one read transaction.

* * * * *